United States Patent Office 3,112,288
Patented Nov. 26, 1963

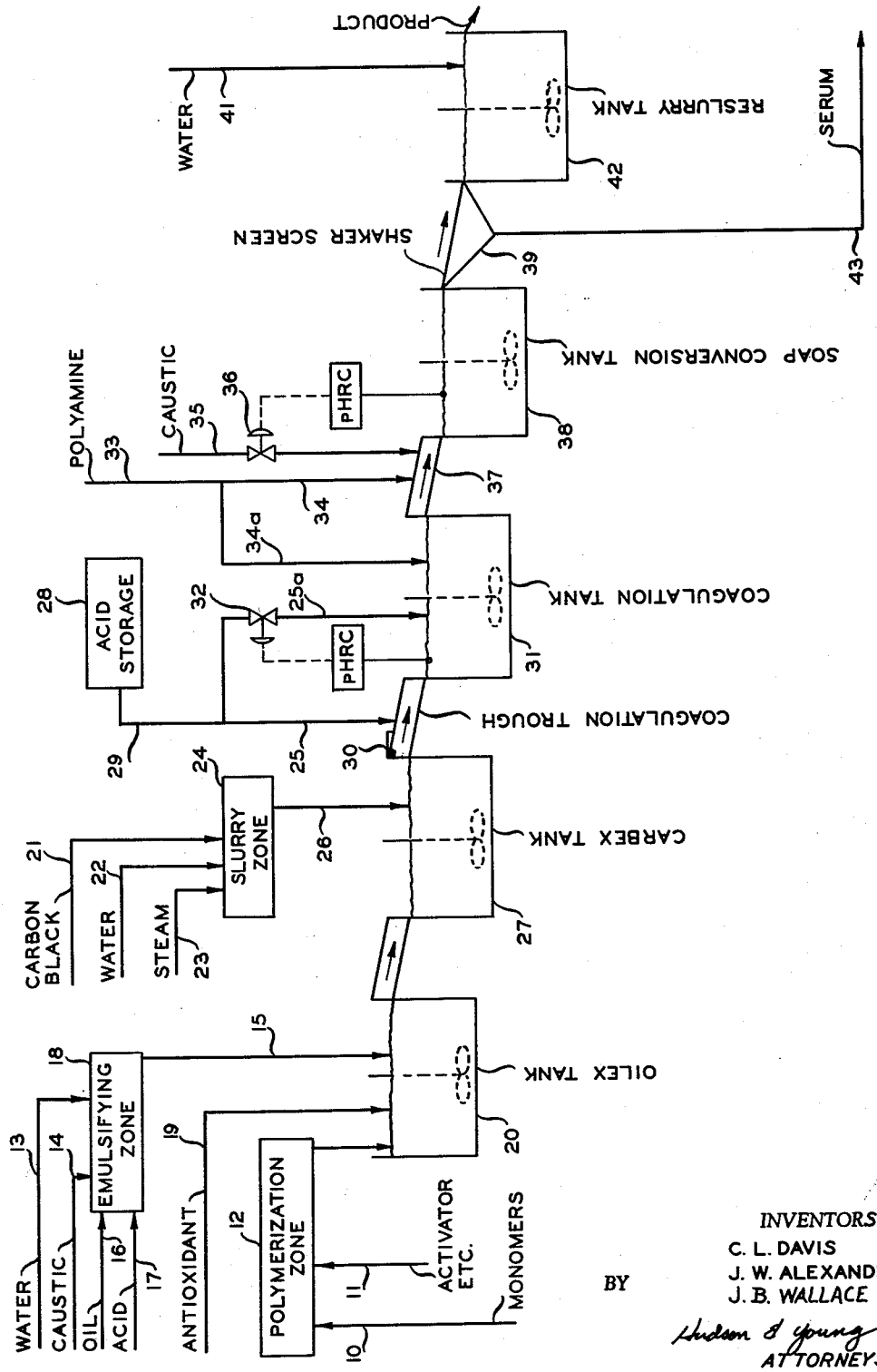

3,112,288
METHOD FOR LATEX COAGULATION
Charles L. Davis, James W. Alexander, and James B. Wallace, Borger, Tex., assignors to Phillips Petroleum Company, a corporation of Delaware
Filed Apr. 8, 1960, Ser. No. 20,956
4 Claims. (Cl. 260—33.6)

This invention relates to the coagulation of a latex. In accordance with one aspect, this invention relates to a method for controlling the crumb size of rubber. In accordance with another aspect, this invention relates to the production of uniformly sized rubber crumb by coagulating a masterbatch in stages in the presence of a polyalkylene polyamine. In accordance with still another aspect, this invention relates to an improved method for the production of uniformly sized crumb from oil-black masterbatch polymers, which are dispersant-free, by coagulation in stages in the presence of a polyalkylene polyamine.

The preparation of synthetic rubber latices is old and well-known. Also various methods have been employed in the past for the preparation of rubber crumb from various masterbatch systems. Oil-black masterbatch polymers comprising a mixture of latex, oil emulsion and carbon black slurry have been particularly troublesome with regard to the production of over-sized crumb, which causes frequent shut-downs of the process to permit cleaning the build-up of large balls of rubber out of the coagulation unit. In an attempt to overcome this problem, various additives have been used, but without appreciable success. In using some additives, large amounts of fines are produced which leads to rubber losses and drying problems. The present invention relates to an improved method for preparing uniformly sized crumb from oil-black masterbatch polymers without the operational problems normally associated with the prior art processes.

Accordingly, an object of this invention is to provide a method for coagulating a latex containing rubber.

Another object of this invention is to provide a method for producing uniformly sized rubber crumb.

Another object of this invention is to provide a method for the coagulation of various latices in a manner so as to control properties of the ultimate rubber product, facilitating processing of the latex being treated and the crumb obtained, and to render more economical the operations involved in producing a rubber.

Another object of this invention is to provide an improved method for coagulating a dispersant-free synthetic rubber containing latex.

Other aspects, objects and the several advantages of the invention are apparent from a study of the specification, the drawing and the appended claims.

According to the present invention, a latex containing rubber is coagulated in stages wherein the latex is first partially coagulated using a coagulating agent and a small amount of a polyalkylene polyamine, and then coagulation is completed by the addition of a sufficient amount of said polyalkylene polyamine to complete the coagulation.

Thus, in accordance with the present invention, we provide an improved method for coagulating in stages a synthetic rubber-containing latex, especially dispersant-free oil-carbon black masterbatch polymers, in the presence of a polyalkylene polyamine to obtain a more uniformly sized crumb which comprises effecting partial coagulation of said latex by the addition of a coagulating agent and a minor proportion of said polyamine thereto to form a slurry containing a coagulum, thereafter completing said coagulation by the addition of the remainder of said polyamine to said coagulum, and then recovering said coagulum from said slurry as said crumb.

By the practice of the present invention, approximately one-third of the total polyamine employed during coagulation is employed during the partial coagulation step. The remainder of the polyamine stream is added to the coagulation zone effluent to complete the coagulation. We have found that the addition of the polyamine stream, as defined, is effective in controlling the crumb size as well as preventing large crumb and/or build-up of large balls of rubber in the coagulation system. We have also found that the addition of the polyamines in stages made operational control much easier because the concentration of polyamine added to the coagulation zone is not as critical as that of other additives. In other words, the addition of the polyamine can be made within wider limits without the formation of fines in the coagulation system but still with proper crumb size control. Further, by operating in accordance with the present invention, a reduction in polyamine usage of 10 to 20 percent was realized over previous practice where all of the polyamine was added to the coagulation effluent.

In the latex masterbatching with oil-type extenders, an emulsion of the oil, which can be prepared by dissolving an emulsifier acid, usually oleic acid or tall oil, in the oil and adding this solution to a dilute aqueous caustic solution to neutralize the acid forming the emulsifier in situ, is mixed with the latex and this mixture is preferably flocculated after addition of carbon black, with a coagulating agent, e.g., an acid, to form rubber particles known as rubber crumb. The crumb is then dried and used in the same manner as other rubbers.

The oil used as an extender is a petroleum oil, usually a highly aromatic fraction. The selection of the particular oil and the amount to be used will be dependent upon the nature of the rubber. For example, those copolymers containing acrylonitrile are oil resistant and will not take as much oil as will some other type polymer, such as a copolymer of butadiene and styrene. It is within the skill of the art to determine the type of oil and amount to be used. Our invention is directed to a method of preparing such blends as are known in the art.

We add carbon black as a slurry, preferably prepared without a dispersing agent, to the oil-extended latex, as described above. The oil-extended latex is mixed with the carbon black slurry before coagulation to form the oil-carbon black masterbatch latex or polymer.

Our invention is particularly applicable to preparing oil and carbon black-extended latices of rubbery polymers. These polymers can be homopolymers of conjugated dienes or copolymers of conjugated dienes with other ethylenically unsaturated monomers copolymerizable therewith. In general, if the polymer is to have rubbery characteristics, that is, to be classified as a synthetic rubber, then the amount of conjugated diene in the recipe will generally be at least 50 weight percent conjugated diene based on the total monomers. However, our invention is not limited to any particular ratio of monomers in the recipe. The only requirement being that the latex be compatible with the oil emulsion. That is, if one should desire to oil extend a latex of resinous polymer, the method of this invention would be operable. However, these oil extended polymers are usually synthetic rubbers.

In general, the amount of oil per 100 parts of rubber will be dependent upon the nature of the copolymer and can vary from 5 to 1000 parts oil per 100 parts rubber by weight. In general, the amount of carbon black added per 100 parts of rubber will be dependent upon the nature of the polymer or copolymer and can be present in an amount up to about 100, or more, parts carbon black per 100 parts rubber by weight.

Monomeric materials that can be polymerized to produce homopolymer and copolymer latices that can be coagulated by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy, or the like. Included in this class of monomers are the conjugated dienes having from 4–8 carbon atoms per molecule, such as butadiene (1,3-butadiene), 2,3-dimethyl-1,3-butadiene, isoprene, piperylene, 3-furyl-1,3-butadiene, 3-methoxy-1,3-butadiene, and the like; haloprenes, such as chloroprene (2 - chloro - 1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alphachloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl acetate vinyl chloride, vinylidene chloride, vinylfurane, vinylcarbazole, vinylacetylene, vinylpyridine, various substituted pyridines, such as 2-methyl-5-vinylpyridine, and other unsaturated hydrocarbons, esters, alcohols, acids, ethers, etc., of the types desribed.

The polyalkylene polyamines that can be used in the present invention are well known materials, the simplest compound effective in the present invention being diethylene triamine (DETA). Other effective compounds in the present invention are triethylene tetramine, tetraethylene pentamine (TEPA), pentaethylene hexamine, heptaethylene octamine, nonaethylene decamine, decaethylene undecyclamine, and higher polyalkylene polyamines, including mixtures thereof, up to polyalkylene polyamines have average molecular weights of 1000 and over. By the term "polyamine" is meant an amine having more than one amino group titratable with strong acid. The amino groups may be primary, secondary or tertiary amino groups.

A very effective polyamine mixture we have used in the invention is an aqueous solution of Polyamine H Special which is a mixture of 75 percent by weight Polyamine H and 25 percent by weight diethylene triamine. The Polyamine H portion is a mixture of ethyleneamines boiling above tetraethylene pentamine, e.g., pentaethylene hexamine and hexaethylene heptamine, and, because of its viscous and sticky nature, it is blended with diethylene triamine to facilitate handling.

Polyamines that can be employed in the invention can be prepared by any method known in the art. One known method for the preparation of the preferred polyamines involves reacting ethylene dichloride with ammonia to form a solution of hydrochlorides. The initial reaction leads to the formation of ethylene diamine which then can react further with dichloride and ammonia to give diethylene triamine. The amines so formed react with additional dichloride and ammonia or amines to produce amines of higher molecular weights, such as triethylene tetramine or tetraethylene pentamine. Materials higher than tetraethylene pentamine are known as Polyamine H, which are usually recovered as bottoms remaining after distillation of tetraethylene pentamine. The Polyamine H fraction is made up of heavy straight chain condensation products as well as tertiary amines of both the branched-chain and cyclic types.

A better understanding of the present invention will be obtained upon reference to the accompanying diagrammatic flow sheet which illustrates a preferred embodiment of the invention.

Referring now to the drawing, monomers, for example, butadiene and styrene, are introduced into polymerizaiton zone 12 by line 10. Other materials needed for carrying out the polymerization, such as soap or emulsifiers, activators, modifiers, etc., are introduced into zone 12 by line 11. The effluent from zone 12 can be sent to a separation zone (not shown) to recover unreacted monomers for recycling to zone 12. The substantially monomer-free latex stream removed from zone 12 which contains about 20 percent solids is passed to agitated tank 20 wherein it is intimately mxed with an antioxidant introduced by line 19 and an oil-in-water emulsion introduced by line 15 to form a latex-oil mixture (Oilex).

The oil-water emulsion is prepared in an emulsifying zone 18 by mixing a petroleum oil, for example, an aromatic oil, introduced by line 16, with an emulsifying acid introduced by line 17, for example, a fatty acid such as oleic acid, caustic introduced by line 14, for example, sodium hydroxide, and water introduced by line 13.

The latex-oil emulsion mixture (Oilex) prepared in tank 20 is removed by an overflow trough and passed to agitated tank 27 wherein the Oilex mixture is blended with carbon black introduced by conduit 26. The carbon black is preferably prepared as a dispersant-free slurry in zone 24. Carbon black, water, and steam are introduced into zone 24 by lines 21, 22, and 23, respectively.

The oil-carbon black masterbatch latex (Carbex) overflows from tank 27 into baffled coagulation trough 30 and is passed to agitated coagulation tank 31. A small stream of a dilute acid, for example, sulphuric acid, or any other suitable coagulating agent, is removed from acid storage zone 28 by conduits 29 and 25 and then introduced into coagulation trough 30 to initiate coagulation of the masterbatch. We have found that better mixing is obtained when a small stream of the coagulating agent is added in trough 30. A major proportion of the dilute acid coagulating agent is added to tank 31 by conduit 25A. The amount of acid added to tank 31 is controlled by valve 32 responsive to the pH in tank 31. The pH in tank 31 generally ranges from about 1.5 to 3.5.

In accordance with the present invention, a minor proportion (less than 50 percent) of the total amount of polyalkylene polyamine to be added during coagulation, preferably about ⅓, is introduced into tank 31 by conduit 34A. The amount of polyamine and other coagulating agent added to tank 31 is insufficient to complete coagulation but is controlled, generally, responsive to crumb size. The total amount of polyamine to be added generally will be about 1 g.p.m. (gallons per minute) of a 1.0 percent solution to about 10 to about 20 g.p.m. (gallons per minute) latex, i.e., about 5 to about 10 volume percent polyamine based on latex. Coagulum is removed from tank 31 by overflowing into trough 37 and passed to agitated tank 38. Also, in accordance with the invention, the remainder of the polyamine solution needed to complete coagulation, which is a major proportion (more than 50 percent), preferably about ⅔, is added to trough 37 by way of conduits 33 and 34. Generally, the effluent from tank 31 is cloudy, but upon addition of the remainder of the polyamine the effluent is cleared up.

A caustic solution, for example, sodium hydroxide, is sometimes added to trough 37 through conduit 35 to raise the cure rate of the vulcanizate and improve filter feeding characteristics of certain rubbers. The amount of caustic added is controlled by valve 36 responsive to the pH in tank 38. The pH in tank 38 is normally controlled between about 4.8 and about 5.2. Also, the residence time for the coagulum in tank 38 is controlled so as to complete coagulation and regulate crumb size. The coagulum containing uniformly sized rubber crumb dispersed therein overflows from tank 38 onto shaker screen 39 wherein the serum is removed from the crumb by conduit 43. The rubber crumb recovered on screen 39 is passed to agitated tank 42 wherein it is reslurried with water introduced by conduit 41. The uniformly sized rubber crumb product overflows from tank 42 and is passed to further processing such as filtering, drying etc.

*Specific Example*

A synthetic rubber latex was prepared by polymerizing 75 parts of 1,3-butadiene and 25 parts of styrene in polymerization zone 12. Unreacted butadiene and styrene were removed from the polymerization effluent and recycled to zone 12. 62 g.p.m. (gallons per minute) latex containing approximately 18 percent solids was removed from zone 12 and was blended in tank 20 with 0.71 g.p.m. (gallons per minute) of an antioxidant (reaction product of diphenylamine and acetone) and 13.6 g.p.m. (gallons per minute) of an oil-in-water emulsion to form a uniform mixture of oil and latex (Oilex). The Oilex mixture obtained in tank 20 was blended with a dispersant-free carbon black slurry in tank 27. The carbon black slurry is composed of 53.6 pounds per minute carbon black, 110 pounds per minute steam condensate, and 120 g.p.m. (gallons per minute) water.

Carbex which is a mixture of latex, oil emulsion and carbon black was removed from tank 27 and passed through trough 30 to coagulation tank 31. 10 g.p.m. (gallons per minute) of dilute sulphuric acid having a pH of 1.2 was introduced into trough 30 to initiate coagulation. 40 g.p.m. (gallons per minute) of the same acid was added to tank 31 by line 25A to substantially complete coagulation.

One gallon per minute of a one percent aqueous Polyamine H solution was introduced into tank 31 through line 34A to assist coagulation. 2 g.p.m. (gallons per minute) of the Polyamine H solution was added to trough 37 to complete coagulation and clear up the coagulum removed from tank 31. The polyamine solution used was prepared by blending 85 pounds of Polyamine H with 8415 pounds of water. The polyamine is a mixture of 75 percent Polyamine H and 25 percent diethylene triamine. The polyamine H portion is a mixture of ethyleneamines boiling above tetraethylene pentamine and is blended with diethylene triamine to facilitate handling. The Polyamine H used had a specific gravity at 25° C. of about 1.0147 and a Brookfield viscosity of about 206 cp. at 25° C.

3.5 g.p.m. (gallons per minute) of a 6 percent caustic (sodium hydroxide) solution was also added to trough 37 to improve the filtering characteristics of the crumb. The coagulum was removed from tank 38 and passed over shaker screen 39 to recover rubber crumb which is passed to tank 42 and slurried with 100 g.p.m. (gallons per minute) water and then the crumb overflows from tank 42 and is recovered as product.

The uniformly sized crumb product obtained contains about 52 parts carbon black and 10 parts oil per 100 parts rubber. By operating in accordance with the present invention, as set forth in the above specific example, the polyamine stream was effective in controlling rubber crumb size as well as preventing large crumb and/or build-up of large balls of rubber in the coagulation system. Also, a reduction in amine usage ranging from 10 to 20 percent was realized.

As will be evident to those skilled in the art many variations and modifications of this invention can be practiced in view of the foregoing disclosure. Such variations and modifications are clearly believed to come within the spirit and scope of the invention.

We claim:

1. An improved method for coagulating dispersant-free masterbatches formed from a conjugated diene rubber containing latex in the presence of a polyalkylene polyamine in a total amount ranging from about 5 to about 10 volume percent based on said latex to obtain a uniformly sized rubber crumb which comprises effecting coagulation of said latex by the addition thereto of an acid coagulating agent and a minor proportion less than 50 percent of said total amount of polyamine to form a slurry containing coagulum, the amount of acid added being sufficient to substantially complete coagulation of said latex and form a slurry having a pH of 1.5 to 3.5, thereafter completing said coagulation by the addition of the remainder of said polyamine to said slurry, and then recovering said coagulum from said slurry as said crumb.

2. An improved method for coagulating a dispersant-free masterbatch formed from a rubber latex formed by polymerizing a monomeric stream comprising a major proportion of a conjugated diene material of 4 to 8 carbon atoms and a minor proportion of a monomer having the structure $CH_2=C<$ copolymerizable therewith, a hydrocarbon oil emulsion and a carbon black slurry in the presence of a dilute aqueous solution of a polyalkylene polyamine in a total amount ranging from about 5 to about 10 volume percent based on said latex to obtain a uniformly sized rubber crumb which comprises the steps of effecting substantially complete coagulation of said latex by the addition thereto of an acid coagulating agent and a minor proportion less than 50 percent of said total amount of polyamine to form a slurry containing coagulum, the amount of acid added being sufficient to substantially complete coagulation of said latex and form a slurry having a pH of 1.5 to 3.5, thereafter completing said coagulation by the addition of the remainder of said polyamine solution to said slurry, and then filtering said coagulum from said slurry as said crumb.

3. A method for the preparation of uniformly sized crumb from 1,3-butadiene rubber containing latex dispersant-free masterbatches by coagulating same in stages in the presence of a polyalkylene polyamine solution containing about 1.0 weight percent polyamine comprising a mixture of high molecular weight polyamines having a specific gravity at 25° C. ranging from 0.995 to 1.02 and a viscosity at 25° C. ranging from about 75 to about 250 centipoises in a total amount ranging from about 5 to about 10 volume percent based on said latex which comprises the steps of blending said rubbery latex with a hydrocarbon oil emulsion to form a mixture containing from 5 to 1000 weight parts of oil per 100 weight parts rubber, blending said mixture thus formed with a carbon black slurry to form an oil-carbon black masterbatch containing up to 100 weight parts carbon black per 100 weight parts rubber, coagulating said masterbatch by adding thereto an acid coagulating agent and about one-third of said polyalkylene polyamine solution, the amount of acid added being sufficient to substantially complete coagulation of said masterbatch and form a slurry having a pH of 1.5 to 3.5 and containing coagulum, thereafter completing said coagulation by addition of the remaining two-thirds of said polyamine solution to said slurry, and then separating said coagulum from said slurry as said crumb.

4. A method for the preparation of uniformly sized rubber crumb from dispersant-free masterbatches formed from a butadiene-styrene rubber containing latex by coagulating same in the presence of a 1.0 percent polyalkylene polyamine solution in a total amount ranging from about 5 to about 10 volume percent based on said latex which comprises polymerizing 1,3-butadiene and styrene to form said latex, blending said latex with a hydrocarbon oil-in-water emulsion to form an intimate mixture of said latex and said emulsion, blending said latex-emulsion mixture with a carbon black slurry to form an oil-carbon black masterbatch, effecting coagulation of said masterbatch by adding thereto sufficient sulfuric acid as coagulating agent and a minor proportion less than 50 percent of said total amount of polyamine solution to form a coagulum-containing slurry having a pH of 1.5 to 3.5, further coagulating said coagulum by adding thereto the remainder of said polymaine solution to complete said coagulation, adjusting the pH of said substantially completely coagulated coagulum by adding thereto sodium hydroxide in an amount sufficient to raise the pH to a value in the range 4.8–5.2, and filtering uniformly sized rubber crumb from said coagulum as a product of the method.

References Cited in the file of this patent

UNITED STATES PATENTS

| | | |
|---|---|---|
| 2,359,667 | Ogilby | Oct. 3, 1944 |
| 2,769,795 | Braendle | Nov. 6, 1956 |
| 2,875,170 | Ayers et al. | Feb. 24, 1959 |
| 2,912,407 | Reynolds et al. | Nov. 10, 1959 |

OTHER REFERENCES

Whitby: Synthetic Rubber, John Wiley and Sons, New York (1954), pages 201, 202 and 676.